(12) United States Patent     (10) Patent No.:   US 12,631,529 B2

Ebihara et al.           (45) Date of Patent:    May 19, 2026

(54) EVAPORATIVE CONCENTRATION DEVICE AND AUTOMATIC ANALYSIS DEVICE

(71) Applicant: Hitachi High-Tech Corporation, Tokyo (JP)

(72) Inventors: Daisuke Ebihara, Tokyo (JP); Shinya Matsuoka, Tokyo (JP); Mayuko Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 335 days.

(21) Appl. No.: 18/576,655

(22) PCT Filed: Jun. 7, 2022

(86) PCT No.: PCT/JP2022/022885

§ 371 (c)(1),
(2) Date: Jan. 4, 2024

(87) PCT Pub. No.: WO2023/286493

PCT Pub. Date: Jan. 19, 2023

(65) Prior Publication Data

US 2024/0310255 A1     Sep. 19, 2024

(30) Foreign Application Priority Data

Jul. 15, 2021    (JP) ................................. 2021-117116

(51) Int. Cl.
*G01N 1/40*        (2006.01)

(52) U.S. Cl.
CPC ... *G01N 1/4022* (2013.01); *G01N 2001/4027* (2013.01)

(58) Field of Classification Search
CPC ......... G01N 1/4022; G01N 2001/4027; G01N 35/0092; G01N 2035/00346; G01N 2035/00465; G01N 35/00
See application file for complete search history.

(56) References Cited

U.S. PATENT DOCUMENTS

2019/0195556 A1   6/2019   Capeder et al.
2020/0309803 A1*   10/2020   Matsuda ............ G01N 35/0092

FOREIGN PATENT DOCUMENTS

CN       201051058 Y    4/2008
JP      2001-276501 A   10/2001
(Continued)

OTHER PUBLICATIONS

International Search Report (PCT/ISA/210) issued in PCT Application No. PCT/JP2022/022885 dated Aug. 16, 2022 with English translation (4 pages).

(Continued)

*Primary Examiner* — Thomas M Hammond, III

(74) *Attorney, Agent, or Firm* — Crowell & Moring LLP

(57) ABSTRACT

Provided is an evaporative concentration device that can simultaneously perform evaporation concentration on a plurality of samples and individually control the evaporation concentration on each sample. The evaporative concentration device according to the present disclosure includes a first flow path and a second flow path connected in parallel to the same decompression source. A decompression valve is configured to perform an operation of opening and closing the first flow path and an operation of opening and closing the second flow path independently of each other.

11 Claims, 7 Drawing Sheets

(56)             References Cited

FOREIGN PATENT DOCUMENTS

| JP | 2015-128744 | A | | 7/2015 |
|----|-------------|---|---|--------|
| JP | 2018080953 | A | * | 5/2018 |

OTHER PUBLICATIONS

Japanese-language Written Opinion (PCT/ISA/237) issued in PCT Application No. PCT/JP2022/022885 dated Aug. 16, 2022 with English translation (5 pages).
Extended European Search Report issued in European Application No. 22841840.6 dated Jun. 20, 2025 (8 pages).

\* cited by examiner

FIG. 3

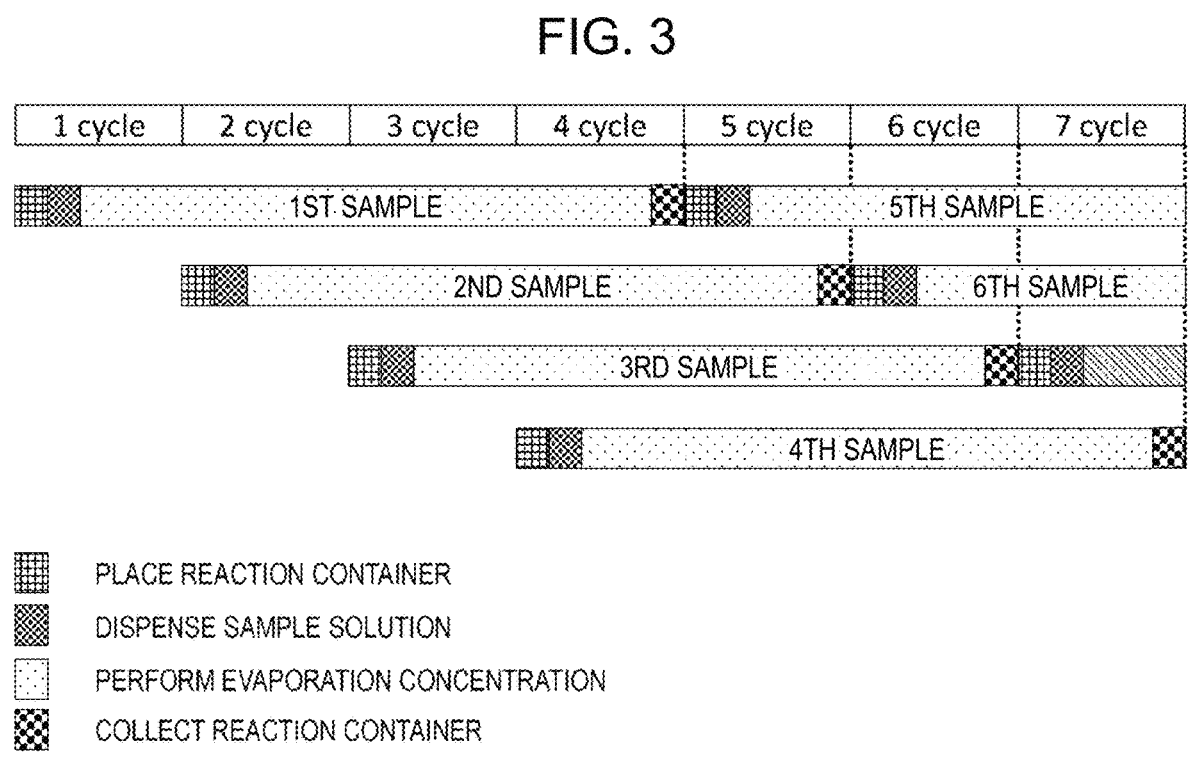

| 1 cycle | 2 cycle | 3 cycle | 4 cycle | 5 cycle | 6 cycle | 7 cycle |

1ST SAMPLE                    5TH SAMPLE

2ND SAMPLE                    6TH SAMPLE

3RD SAMPLE

4TH SAMPLE

PLACE REACTION CONTAINER

DISPENSE SAMPLE SOLUTION

PERFORM EVAPORATION CONCENTRATION

COLLECT REACTION CONTAINER

| 1 cycle | 2 cycle | 3 cycle | 4 cycle | 5 cycle | 6 cycle | 7 cycle |
|---|---|---|---|---|---|---|

PLACE REACTION CONTAINER

DISPENSE SAMPLE SOLUTION

PERFORM EVAPORATION CONCENTRATION

STAND BY AFTER END OF DECOMPRESSION

COLLECT REACTION CONTAINER

FIG. 5

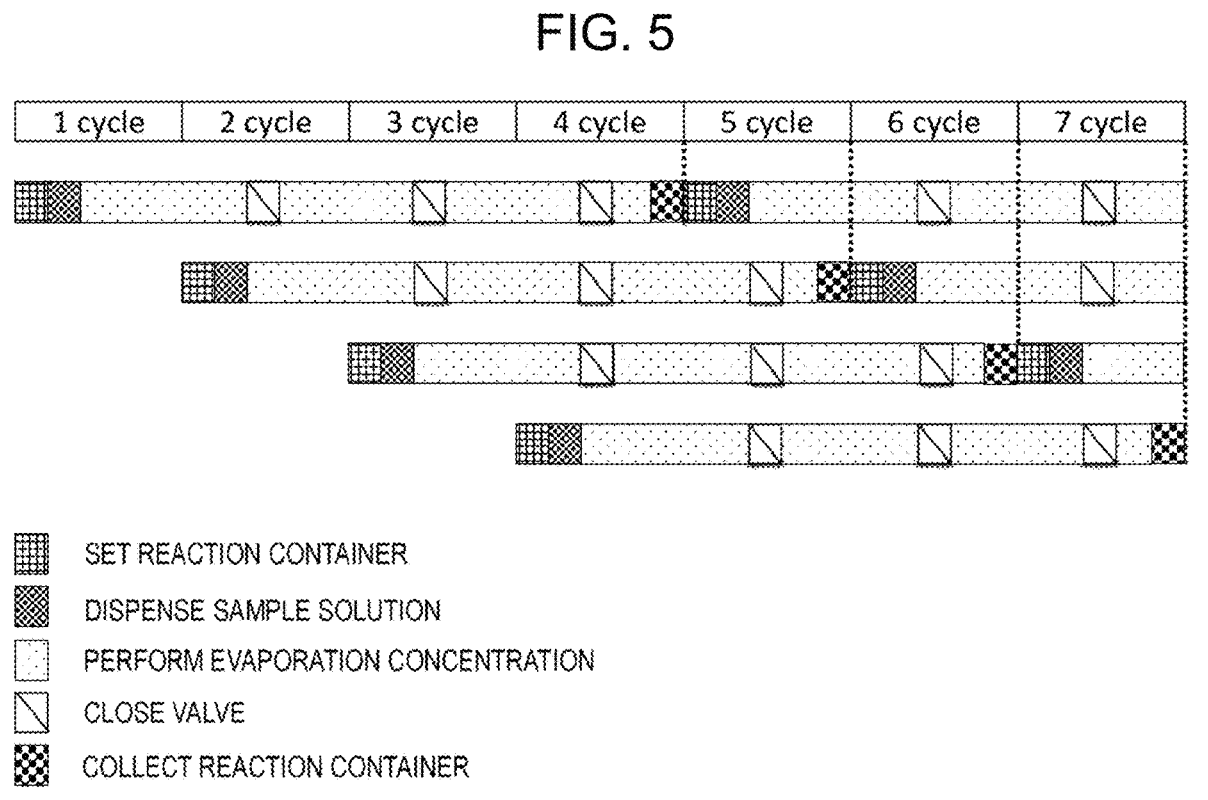

| 1 cycle | 2 cycle | 3 cycle | 4 cycle | 5 cycle | 6 cycle | 7 cycle |
|---------|---------|---------|---------|---------|---------|---------|

▦ SET REACTION CONTAINER

▨ DISPENSE SAMPLE SOLUTION

▢ PERFORM EVAPORATION CONCENTRATION

◻ CLOSE VALVE

▩ COLLECT REACTION CONTAINER

FIG. 7

EVAPORATIVE CONCENTRATION DEVICE AND AUTOMATIC ANALYSIS DEVICE

TECHNICAL FIELD

This disclosure relates to an evaporative concentration device of an automatic analyzer.

BACKGROUND ART

In an automatic analyzer which analyzes the components of a sample, evaporation concentration may be performed for the purpose of enhancing sensitivity at analysis and removing organic solvents. The evaporation concentration is processing of evaporating the solvent of a sample containing a substance to be analyzed to increase the concentration of the substance. Bumping may occur in the process of the evaporation concentration, and methods such as controlling a decompression speed during evaporation concentration are sometimes used to prevent the bumping.

Patent Literature 1 described below describes a technology in which with "suppressing bumping of a drug in a storage container without reducing the cleanliness of the drug in the storage container" taken as a problem, "a concentration device 1 is a concentration device which includes a storage container 3 containing a drug 4 including a solvent, a decompression unit 5 capable of decompressing the inside of the storage container 3, and a line L1 that connects the storage container 3 and the decompression unit 5, and decompresses the inside of the storage container 3 by the decompression unit 5, thereby evaporating the solvent contained in the drug 4 stored in the storage container 3 to concentrate the drug 4, and in which a gas supply unit 7 capable of supplying gas to the line L1 is connected to the line L1 between the storage container 3 and the decompression unit 5" (refer to abstract).

CITATION LIST

Patent Literature

PTL 1: Japanese Unexamined Patent Application Publication No. 2015-128744

SUMMARY OF INVENTION

Technical Problem

In an automatic analyzer, it may be necessary to execute evaporation concentration processing on a plurality of samples simultaneously. On the other hand, the evaporation concentration processing on each sample is required to be controlled individually for each sample according to the characteristics of the sample, analysis items, and the like. A conventional evaporation concentration mechanism does not consider achieving such two objectives simultaneously.

The present disclosure has been made in view of the above problems, and it is an object of the present disclosure to provide an evaporative concentration device capable of simultaneously performing evaporation concentration processing on a plurality of samples, and individually controlling, for each sample, the evaporation concentration processing on each sample.

Solution to Problem

An evaporative concentration device of this disclosure includes a first flow path and a second flow path connected in parallel to the same decompression source, and a decompression valve is configured to perform an operation of opening and closing the first flow path and an operation of opening and closing the second flow path independently of each other.

Advantageous Effects of Invention

According to an evaporative concentration device of the present disclosure, an evaporation concentration processing on a plurality of samples is performed simultaneously, and the evaporation concentration processing on each sample is controlled individually for each sample. Features, advantages, and configurations other than the present disclosure will be apparent from the description of the following embodiments.

BRIEF DESCRIPTION OF DRAWINGS

FIG. 3 is a time chart illustrating an operation of the evaporative concentration device 2.

FIG. 5 is a timing chart illustrating an operation of the evaporative concentration device 2 according to a third embodiment.

FIG. 7 is a graph showing a pressure change when a decompression valve 24 and a branch valve 27 are intermittently opened and closed in an opening/closing pattern shown in FIG. 6, and a pressure change when the decompression valve 24 and the branch valve 27 are not intermittently opened and closed.

DESCRIPTION OF EMBODIMENTS

First Embodiment

Figure 1:
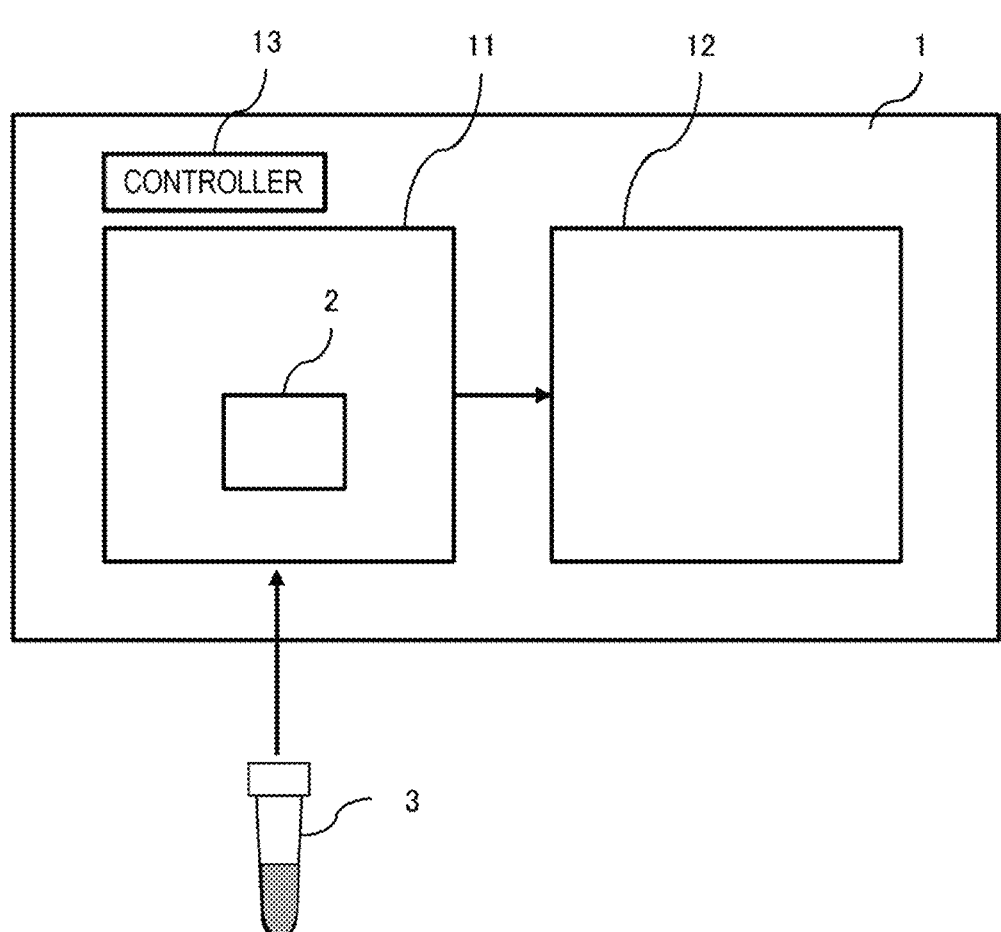
FIG. 1 is a configuration diagram of an automatic analyzer 1 according to a first embodiment.

FIG. 1 is a configuration diagram of an automatic analyzer 1 according to a first embodiment 1 of the present disclosure. The automatic analyzer 1 is a device that analyzes components of a sample, and includes a pretreatment unit 11, an analysis unit 12, a controller 13, and an evaporative concentration device 2.

A user installs, in the pretreatment unit 11, a reaction container 3 containing sample liquid containing a sample to be analyzed. The pretreatment unit 11 performs preanalytical treatments such as addition of a reaction reagent to the sample liquid contained in the reaction container 3 and purification of the sample liquid. In the pretreatment process, the evaporative concentration device 2 increases the concentration of the sample to be analyzed in the sample liquid by, for example, evaporating only the solvent in the sample liquid. The sample liquid having been subjected to the pretreatment is analyzed by the analysis unit 12. The analysis unit 12 can be configured by, for example, a mass spectrometer.

The controller 13 controls each part provided in the automatic analyzer 1. The controller 13 also controls each part (for example, each valve to be described later) provided in the evaporative concentration device 2. The controller that controls the automatic analyzer 1 and the controller that controls the evaporative concentration device 2 may be integrated as illustrated in FIG. 1 or may be provided separately. The configuration of FIG. 1 is assumed in the following description.

Figure 2:
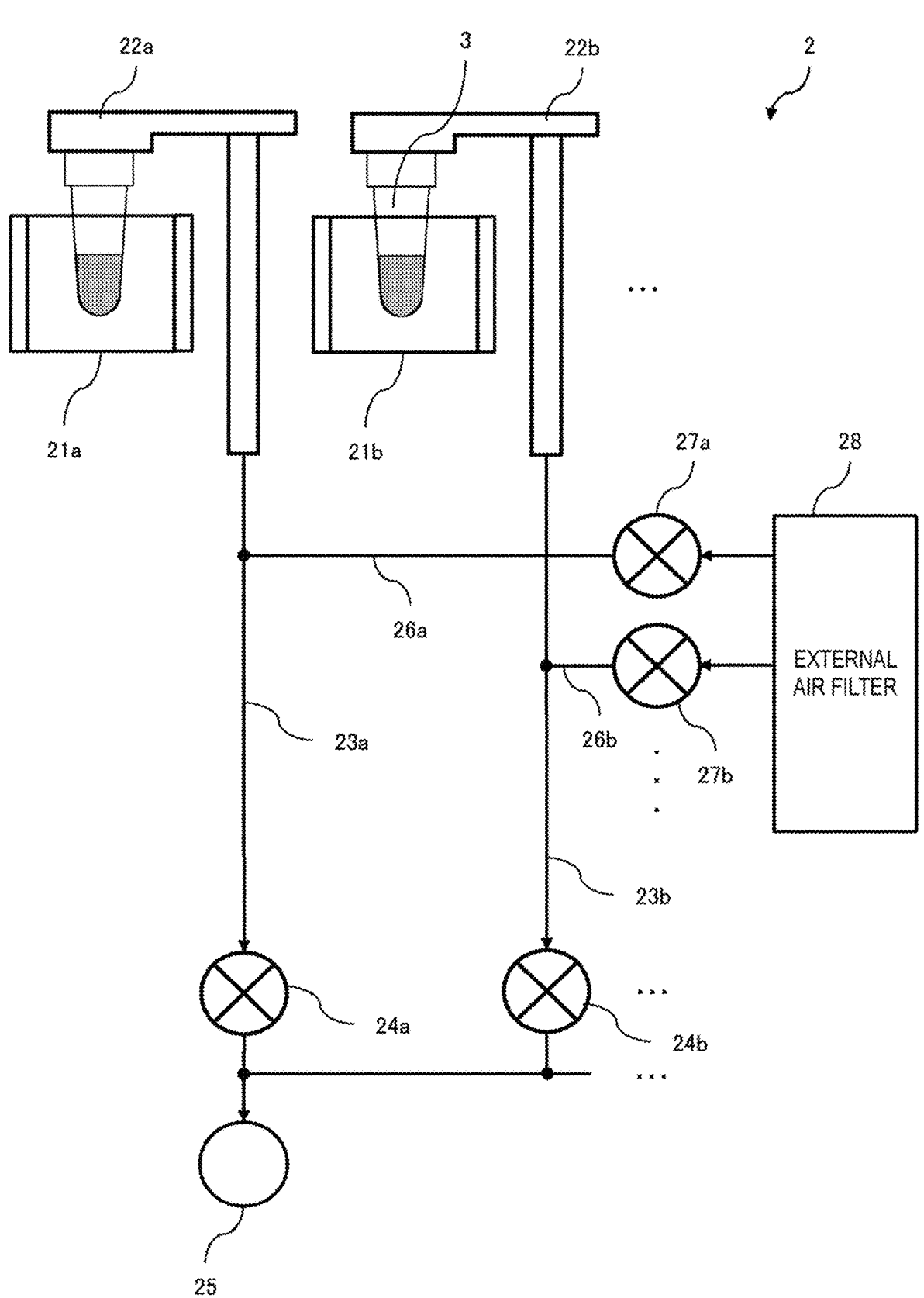
FIG. 2 is a view showing a detailed configuration of an evaporative concentration device 2.

FIG. 2 is a diagram illustrating the detailed configuration of the evaporative concentration device 2. The evaporative concentration device 2 includes a heater 21, an exhaust unit 22, a decompression flow path 23, a decompression valve 24, a decompression source 25, a branch flow path 26, a branch valve 27, and an external air filter 28. When a plurality of the same components are present, they are distinguished by alphabetic suffixes a, b, etc. In FIG. 2, the heaters 21a and 21b, the exhaust units 22a and 22b, the decompression flow paths 23a and 23b, the decompression valves 24a and 24b, the branch flow paths 26a and 26b, and the branch valves 27a and 27b each have the same components that are arranged two each. Sets of three or more components can also be arranged.

The heater 21 is a space for accommodating the reaction container 3 and performing evaporation concentration. With the reaction container 3 installed in the heater 21 and the exhaust unit 22 connected to an intake port of the reaction container 3, the inside of the reaction container 3 is depressurized and the reaction container 3 is heated to perform evaporation concentration processing. Gas evaporated from the sample liquid in the reaction container 3 is discharged to the decompression flow path 23 via the exhaust unit 22.

The decompression flow path 23 is connected to the decompression source 25 via the decompression valve 24. When the decompression valve 24 is opened, the inside of the reaction container 3 is depressurized via the decompression flow path 23 and the exhaust unit 22 by the action of the decompression source 25. When the decompression valve 24 is closed, the pressure reducing action is interrupted.

A plurality of sets of flow paths from the heater 21 to the decompression source 25 (heater 21, exhaust unit 22, decompression flow path 23, decompression valve 24, and decompression source 25) can be arranged with these being considered as one set, as illustrated in FIG. 2. However, every flow path is connected to the single decompression source 25 (for example, the decompression flow paths 23a and 23b and the decompression valves 24a and 24b are connected in parallel to the decompression source 25).

The decompression flow path 23a is connected to the exhaust unit 22a, but is not connected to the exhaust unit 22b. The decompression flow path 23b is connected to the exhaust unit 22b, but is not connected to the exhaust unit 22a. Therefore, the reaction container 3 connected to the exhaust unit 22a and the reaction container 3 connected to the exhaust unit 22b are subjected to the evaporation concentration processing independently of each other.

The branch flow path 26 is branched from the decompression flow path 23. The branch valve 27 is arranged between the branch flow path 26 and the external air filter 28. When the branch valve 27 is opened, the inside of the reaction container 3 is opened to the external air via the branch flow path 26 and the decompression flow path 23. When the branch valve 27 is closed, the inside of the reaction container 3 is cut off from the external air.

A plurality of sets of flow paths from the heater 21 to the external air filter 28 (heater 21, exhaust unit 22, decompression flow path 23, branch valve 27, to external air filter 28) can be arranged with these being considered as one set, as illustrated in FIG. 2. Since the branch flow path 26 is branched from the decompression flow path 23, substantially, a flow path group that combines the flow path leading to the decompression source 25 and the flow path leading to the external air filter 28 is connected to one heater 21.

The branch flow path 26a is connected to the decompression flow path 23a (i.e., exhaust unit 22a), but is not connected to the decompression flow path 23b (i.e., exhaust unit 22b). The branch flow path 26b is connected to the decompression flow path 23b (i.e., exhaust unit 22b), but is not connected to the decompression flow path 23a (i.e., exhaust unit 22a). Therefore, the reaction container 3 connected to the exhaust unit 22a and the reaction container 3 connected to the exhaust unit 22b are opened to the external air independently of each other.

FIG. 3 is a time chart describing the operation of the evaporative concentration device 2. Here, the operation in a configuration in which four heaters 21 are arranged (that is, evaporation concentration is performed individually for four reaction containers 3) is illustrated. Therefore, the exhaust unit 22, the decompression flow path 23, the decompression valve 24, the branch flow path 26, and the branch valve 27 are also each arranged four. The first to fourth lines respectively represent operation procedures in the first to fourth heating chambers.

When the reaction container 3 is installed in the first heater and the sample liquid is dispensed into the reaction container 3, evaporation concentration (decompression by the decompression source 25) in the first heater is started. Before the evaporation concentration in the first heater is completed, steps from the installation of the reaction container 3 to the start of evaporation concentration are sequentially performed in the second to fourth heaters as well.

In the evaporation concentration processing, the inside of the reaction container 3 is depressurized over time. When the maximum reduced pressure is reached, it is maintained for a certain period of time, and then the reaction container 3 is opened to the atmosphere. Evaporation concentration is performed in the same procedure in each heater.

When the evaporation concentration in the first heater is completed, the reaction container 3 is recovered from the first heater, and the next reaction container 3 is installed in the first heater. Also in each of the second to fourth heaters, when the evaporation concentration is completed, the reaction container 3 is recovered and the next reaction container 3 is installed. The same applies to subsequent operation procedures.

First Embodiment: Summary

The evaporative concentration device 2 according to the first embodiment includes the decompression flow paths 23a and 23b which operate independently of each other. These are configured to be able to depressurize the reaction containers 3 in the respective heaters 21 without interfering with each other by the decompression valves 24a and 24b. Consequently, each reaction container 3 held in each heater 21 can be individually subjected to the evaporation concentration processing.

In the evaporative concentration device 2 according to the first embodiment, the decompression flow paths 23a and 23b are connected in parallel to the decompression source 25. Consequently, the evaporation concentration can be performed collectively for the respective reaction containers 3. Further, the evaporation concentration of each reaction container 3 can be performed individually according to the characteristics of the sample liquid, analysis items, and the like.

The evaporative concentration device 2 according to the first embodiment includes the branch flow paths 26a and 26b that operate independently of each other. These are configured to be able to open the reaction containers 3 to the atmosphere without interfering with each other by the branch valves 27a and 27b. Consequently, each reaction container 3 held by each heater 21 can be individually subjected to the evaporation concentration processing.

In the evaporative concentration device 2 according to the first embodiment, the plurality of decompression flow paths 23 are connected in parallel to the single decompression source 25. Consequently, the evaporation concentration for each reaction container 3 can be individually controlled, and the space for installing the decompression source 25, the cost of members, and the like can be suppressed.

Since the evaporative concentration device 2 according to the first embodiment performs the evaporation concentration processing individually for each reaction container 3, it can sequentially perform the analysis process in order from the reaction containers 3 whose evaporation concentration is completed, without waiting until the evaporation concentration processing is completed for the reaction containers 3 of the number collected to some extents. That is, since data such as analysis results can be obtained sequentially, the evaporative concentration device 2 is suitable for an apparatus in which the process proceeds automatically particularly as in the automatic analyzer 1.

Second Embodiment

Figure 4:
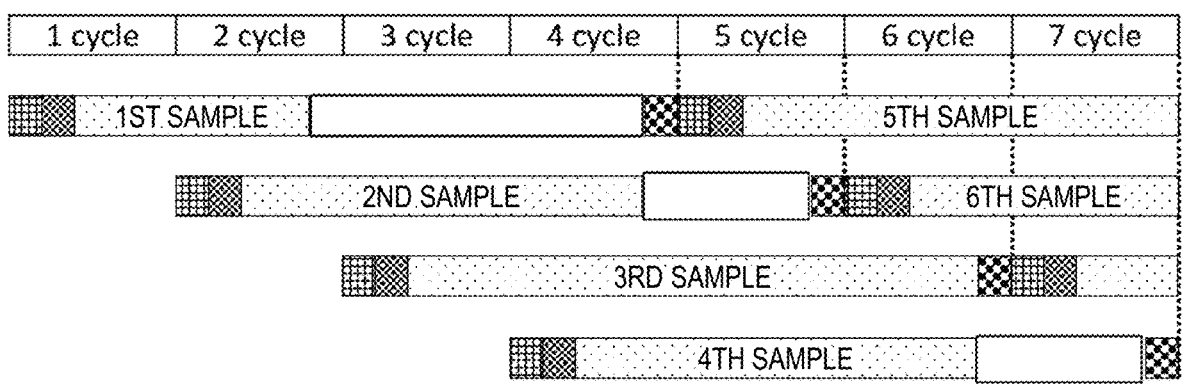
FIG. 4 is a time chart illustrating an operation of the evaporative concentration device 2 according to a second embodiment.

FIG. 4 is a time chart describing the operation of an evaporative concentration device 2 according to a second embodiment of the present disclosure. The evaporative concentration device 2 and an automatic analyzer 1 are the same in configuration as the first embodiment. Since sample liquid and analysis items contained in each reaction container 3 may be respectively different, each time required for evaporation concentration may be different accordingly respectively. FIG. 4 illustrates such an example.

If the cycle time from the installation of the reaction container 3 in each heater to its recovery is the same even if the time required for the evaporation concentration is different, it is desirable from the viewpoint of simplifying control scheduling. Therefore, in FIG. 4, a standby time was provided after the completion of evaporation concentration for each sample for which the evaporation concentration was completed in a short period of time. Specifically, a controller 13 may set the standby time for each heater 21 so that the time from introducing the reaction container 3 to the heater 21 to recovering the reaction container 3 is the same for each heater 21. In FIG. 4, the standby time for each heater 21 is set based on the third heater having the longest evaporation concentration time.

The evaporation concentration time (or standby time) of each reaction container 3 is defined by the type of liquid contained in the reaction container 3 and analysis items. Accordingly, the controller 13 may acquire information describing a correspondence relationship between the liquid type or analysis items and the evaporation concentration time and determine these times for each reaction container 3 according to the information. This information may be stored in advance in a storage device, or may be acquired from outside the device at an appropriate timing such as when the evaporation concentration processing is started.

Third Embodiment

FIG. 5 is a time chart describing the operation of an evaporative concentration device 2 according to a third embodiment of the present disclosure. The evaporative concentration device 2 and an automatic analyzer 1 are the same in configuration as the first embodiment. In the third embodiment, each valve connected to other reaction containers 3 is closed when evaporation concentration is started for a new reaction container 3.

When the evaporation concentration is started for the new reaction container 3, the pressure inside the reaction container 3 is not sufficiently lowered, so that if it is fluidically connected to another reaction container 3 as it is, there is a possibility that the pressure inside another reaction container 3 will be affected unintentionally. Therefore, in the third embodiment, a decompression valve 24 and a branch valve 27 connected to other reaction containers 3 are closed ("close the valve" in FIG. 5). Cycles 1 to 4 in FIG. 5 indicate such a situation. Since the reaction container 3 is newly connected to the first flow path in the next cycle 5 (the evaporation concentration is newly started), the respective valves are closed in the second to fourth flow paths. The same applies hereinafter.

When the pressure inside the reaction container 3 having newly started the evaporation concentration is sufficiently lowered (it reaches predetermined pressure), there is no problem even if the reaction container 3 is fluidically connected to each of other reaction containers 3. Therefore, at that time, the valve connected to the other reaction container 3 is opened again. It is for this reason that a valve closing period is limited in FIG. 5. Other operations are the same as those of the first and second embodiments.

The predetermined pressure inside the reaction container 3 may differ for each reaction container 3, or may be the same for all. Since the predetermined pressure of each reaction container 3 is defined for each sample type and analysis item, for example, as described in the second embodiment, the controller 13 may acquire information describing the predetermined pressure and determine the timing of opening and closing each valve according to the information. As for a pressure value thereof, a pressure sensor may be installed at an appropriate location on the flow path to acquire its measured value.

Fourth Embodiment

Figure 6:
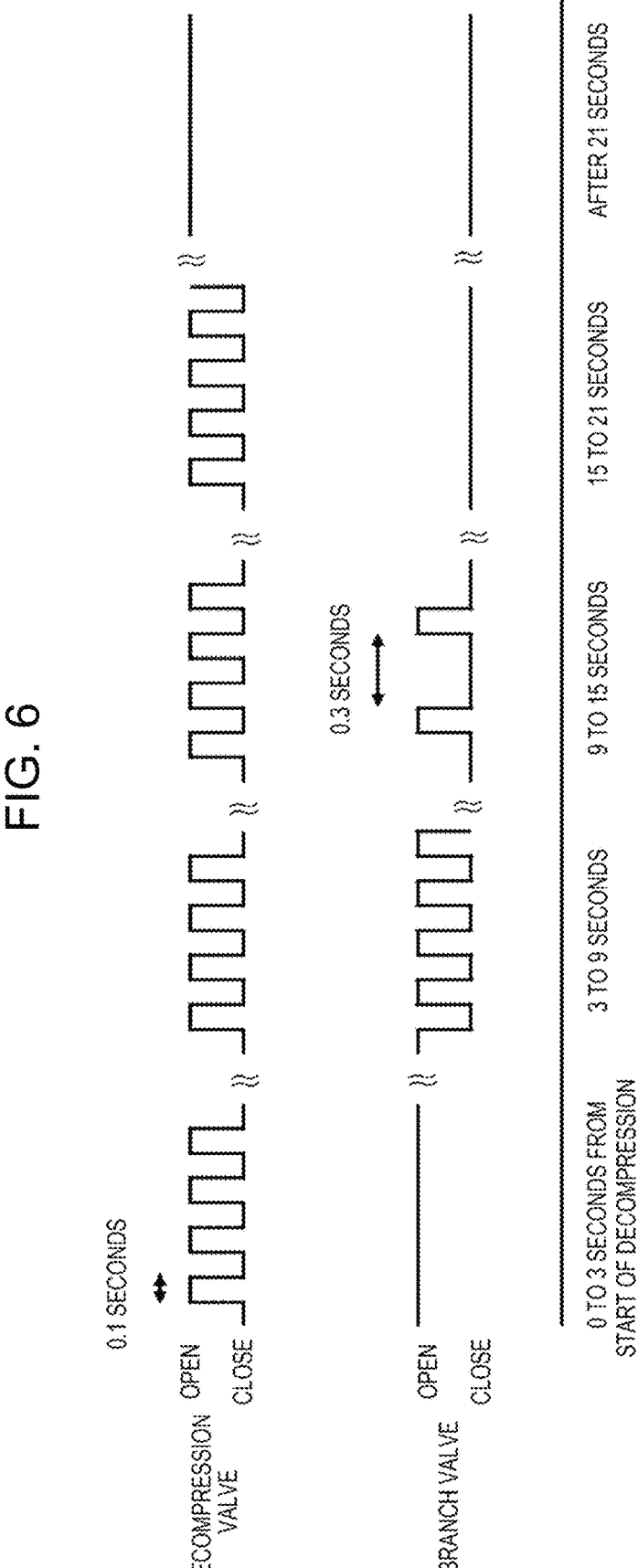
FIG. 6 is a time chart illustrating an opening/closing operation of each valve when the evaporative concentration device 2 performs evaporation concentration according to a fourth embodiment.

FIG. 6 is a time chart describing the opening/closing operation of each valve when an evaporative concentration device 2 according to a fourth embodiment of the present disclosure performs evaporation concentration processing. The evaporative concentration device 2 may intermittently open the inside of a reaction container 3 to the atmosphere by repeating the opening/closing operation of a branch valve 27. Thus, as will be described below, a decompression speed can be made gradual to suppress bumping. Other configurations are the same as those of the first and second embodiments.

As illustrated in FIG. 6, for 3 seconds from the start of decompression (first decompression period), a decompression valve 24 is opened and closed at a frequency of 0.1 seconds open and 0.1 second close, and the branch valve 27 is set in an opened state. For 3 seconds to 9 seconds from the start of decompression (second decompression period) and for 9 seconds to 15 seconds (third decompression period), the opening/closing frequency of the decompression valve 24 remains unchanged. For 3 seconds to 9 seconds from the start of decompression (second compression period), the branch valve 27 is opened and closed at a frequency of 0.1 seconds open and 0.1 seconds close. For 9 seconds to 15 seconds (third decompression period), the branch valve 27 is opened and closed at a frequency of 0.1 seconds open and 0.3 seconds close. For 15 seconds to 21 seconds from the start of decompression (fourth decompression period), the opening/closing frequency of the decompression valve 24 remains unchanged, and the branch valve 27 is set in a closed state. After 21 seconds from the start of decompression, the decompression valve 24 is set in the opened state, and the branch valve 27 is set in the closed state.

As described above, by changing the opening/closing frequency of the decompression valve 24 and the opening/closing frequency of the branch valve 27 in stages from the start of decompression, the degree of decompression in the decompression flow path 23 and the reaction container 3 is controlled. The opening and closing times of the decompression valve 24 and the branch valve 27 can be set to arbitrary lengths according to the desired degree of decompression, respectively. If the lengths of the open time and the close time are set to be within approximately one second, a change in decompression can be made gradual.

One or more opening/closing patterns of the decompression valve 24 and the branch valve 27 are set to the controller 13 in advance. The opening/closing pattern can be arbitrarily set according to the sample liquid amount, the property of the sample liquid, and the desired amount of evaporation of a solvent at the start of evaporation. The opening/closing patterns include the opening/closing times of the decompression valve 24 and the branch valve 27 as well as the opening/closing start/end timings.

Figure 7:
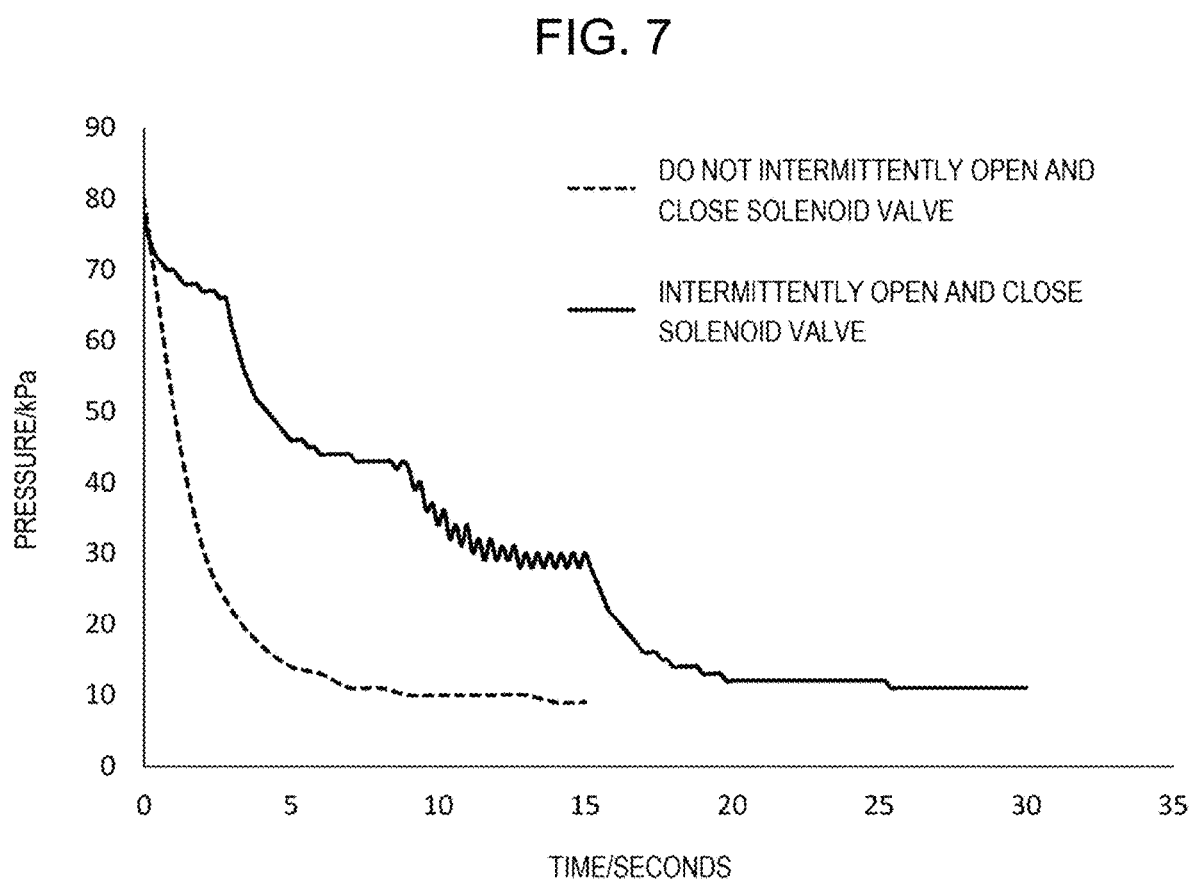

FIG. 7 is a graph illustrating a pressure change when the decompression valve 24 and the branch valve 27 are intermittently opened and closed in the opening/closing patterns illustrated in FIG. 6, and a pressure change when the intermittent opening/closing is not performed. The vertical axis indicates pressure/kPa, and the horizontal axis indicates the time/second. A solid line indicates a pressure change in the case of the presence of an intermittent opening/closing of a solenoid valve, and a broken line indicates a pressure change in the case of the absence of the intermittent opening/closing of the solenoid valve.

As illustrated in FIG. 7, the change in decompression can be made gradual by the high frequency opening/closing of the decompression valve 24 and the branch valve 27. A sudden pressure change at the time of evaporation concentration causes bumping. The bumping at the evaporation concentration can be suppressed by using the third embodiment.

When the inside of the reaction container 3 is gradually depressurized as in the fourth embodiment, a certain degree of long time is required until the pressure inside the reaction container 3 is sufficiently lowered. When the reaction container 3 is fluidically connected to another reaction container 3 in a stage where the pressure inside the reaction container 3 is not sufficiently reduced, there is a possibility that an unintended effect will be given to the pressure inside another reaction container 3. In the fourth embodiment, such an unintended effect can be avoided by temporarily closing each valve as described in the third embodiment. Therefore, it is preferable to combine the third and fourth embodiments.

Regarding Modifications of Present Disclosure

The present disclosure is not limited to the embodiments described above, and includes various modifications. For example, the above-described embodiments have been described in detail in order to describe the present disclosure in an easy-to-understand manner, and do not necessarily have to include all the configurations described. Also, a part of one embodiment can be replaced with the configuration of another embodiment. Further, the configuration of another embodiment can be added to the configuration of one embodiment. In addition, with respect to a part of the configuration of each embodiment, it is also possible to add, delete, or replace a part of the configuration of another embodiment.

In the above embodiment, the length of time to perform the evaporation concentration on each reaction container 3 may be determined by the predetermined cycle lengths as illustrated in FIGS. 3 to 5, or the evaporation concentration may be continued until the criteria are met. There are considered, for example, (a) the evaporation concentration is stopped when the pressure in the reaction container 3 reaches the predetermined pressure (i.e., the decompression valve 24 is opened to open the branch valve 27), (b) the evaporation concentration is stopped when a liquid level height in the reaction container 3 reaches a predetermined height, and the like. In this case, the controller 13 determines whether or not these criteria are satisfied from the measured results of a pressure sensor, a liquid level sensor, etc.

Although the decompression valves 24a and 24b are configured by two valves in FIG. 2, they may be replaced by, for example, one valve having two flow paths hermetically sealed with each other. That is, the operation of connecting the decompression flow path 23a and the decompression source 25 and the operation of connecting the decompression flow path 23b and the decompression source 25 can be performed independently of each other, and all or part of the decompression valves 24 can also be replaced by the single valve if the fluids flowing through the respective flow paths do not interfere with each other. The same applies even when the decompression flow path 23 and the decompression valve 24 are arranged in three or more sets.

In the above embodiments, the evaporation concentration is to evaporate and concentrate the liquid in the reaction container 3 by heating with the heater 21 and decompression by the decompression source 25. It should be noted that the evaporation concentration procedure in the present disclosure does not necessarily have to be used when the liquid is concentrated only by heating.

REFERENCE SIGN LIST

1 automatic analyzer
2 evaporative concentration device
21 heater
22 exhaust unit
23 decompression flow path
24 decompression valve
25 decompression source
26 branch flow path
27 branch valve
28 external air filter

The invention claimed is:

1. An evaporative concentration device configured to concentrate a liquid stored in a container by evaporating the liquid, the evaporative concentration device comprising:
   a decompression source configured to generate a negative pressure for decompressing an inside of the container;
   an exhaust unit configured to discharge vapor from the container, the vapor being generated from the liquid stored in the container, wherein the exhaust unit includes a first exhaust unit configured to discharge vapor from a first container and a second exhaust unit configured to discharge vapor from a second container;

a decompression flow path that connects the exhaust unit and the decompression source, wherein the decompression flow path includes a first flow path and a second flow path connected in parallel to the same decompression source;

a branch flow path branched from the decompression flow path between the container and the decompression source;

a decompression valve configured to control an internal pressure of the container by opening and closing the decompression flow path, the decompression valve is configured to perform an operation of opening and closing the first flow path and an operation of opening and closing the second flow path independently of each other;

a controller configured to control the decompression valve, wherein the decompression valve includes a first valve configured to open and close the first flow path and a second valve configured to open and close the second flow path, and wherein the controller is further configured to control the first valve and the second valve independently of each other; and a branch valve configured to open and close the inside of the container to and from the atmosphere by opening and closing the branch flow path, wherein, the first flow path is connected to the first exhaust unit and not connected to the second exhaust unit, and thereby configured to depressurize the first container independently of the second container, the second flow path is connected to the second exhaust unit and not connected to the first exhaust unit, and thereby configured to depressurize the second container independently of the first container, and the controller is further configured to depressurize the first container and the second container independently of each other by controlling the first valve and the second valve independently of each other.

2. The evaporative concentration device according to claim 1, wherein the branch flow path includes a third flow path branched from the first flow path and a fourth flow path branched from the second flow path, and the branch valve is configured to perform an operation of opening and closing the third flow path and an operation of opening and closing the fourth flow path independently of each other.

3. The evaporative concentration device according to claim 2, further comprising:

a controller configured to control the branch valve, wherein the decompression valve includes a third valve configured to open and close the third flow path and a fourth valve configured to open and close the fourth flow path, and the controller is configured to control the third valve and the fourth valve independently of each other.

4. The evaporative concentration device according to claim 3, wherein the exhaust unit includes a first exhaust unit configured to discharge vapor from a first container and a second exhaust unit configured to discharge vapor from a second container, the third flow path is connected to the first exhaust unit and not connected to the second exhaust unit, and thereby configured to open the first container to the atmosphere independently of the second container, the fourth flow path is connected to the second exhaust unit and not connected to the first exhaust unit, and thereby configured to open the second container to the atmosphere independently of the first container, and the controller is configured to open the first container and the second container to the atmosphere independently of each other by controlling the third valve and the fourth valve independently of each other.

5. The evaporative concentration device according to claim 1, wherein the controller is configured to acquire first information on a physical state of a first analysis target included in the liquid in the first container, the controller is configured to acquire second information on a physical state of a second analysis target included in the liquid in the second container, and the controller is configured to individually control a decompression operation for the first container and a decompression operation for the second container according to the first information and the second information.

6. The evaporative concentration device according to claim 5, wherein the controller is configured to perform evaporation concentration on the first container for a first period of time, the controller is configured to perform evaporation concentration on the second container for a second period of time, the first period of time is determined according to the first information, and the second period of time is determined according to the second information.

7. The evaporative concentration device according to claim 1, wherein the controller is configured to place the first container in a first heating chamber, decompress the first container, and then cause the first container to stand by for a first period of time until the controller collects the first container from the first heating chamber, the controller is configured to place the second container in a second heating chamber, decompress the second container, and then cause the second container to stand by for a second period of time until the controller collects the second container from the second heating chamber, and the controller is configured to adjust the first period of time and the second period of time such that a first elapsed time from placement of the first container to collection of the first container is equal to a second elapsed time from placement of the second container to collection of the second container.

8. The evaporative concentration device according to claim 1, wherein the controller is configured to keep the second valve closed from a start of evaporation concentration on the first container until a pressure in the first container reaches a first pressure value, and open the second valve when the pressure in the first container reaches the first pressure value, and the controller is configured to keep the first valve closed from a start of the evaporation concentration on the second container until a pressure in the second container reaches a second pressure value, and open the first valve when the pressure in the second container reaches the second pressure value.

9. The evaporative concentration device according to claim 1, further comprising:

a controller configured to control the decompression valve and the branch valve, wherein the controller is configured to repeat an operation of opening and closing the branch valve while decompressing the inside of the container, so as to decompress internal pressure of the container more slowly than a case without opening or closing the branch valve.

10. The evaporative concentration device according to claim 1, further comprising:

a controller configured to perform evaporation concentration on the container by controlling the decompression valve, wherein the controller is configured to stop the evaporation concentration on the container at least one of a time when a pressure in the container reaches a predetermined pressure or a time when a liquid level height in the container reaches a predetermined height.

11. An automatic analyzer, comprising:

the evaporative concentration device according to claim 1;

a pretreatment unit configured to perform preanalytical treatments on the liquid; and an analysis unit configured to analyze the pretreated liquid.

* * * * *